United States Patent [19]
Lin

[11] Patent Number: 6,022,105
[45] Date of Patent: Feb. 8, 2000

[54] DETACHABLE SUNGLASSES WITH ADJUSTABLE BRIDGE

[76] Inventor: David Gu Lin, 736 S. Garfield Ave., Monterey Park, Calif. 91754

[21] Appl. No.: 09/289,574

[22] Filed: Apr. 10, 1999

[51] Int. Cl.[7] ...................................................... G02C 9/00
[52] U.S. Cl. ................................ 351/47; 351/57; 351/128
[58] Field of Search .................................. 351/44, 47, 57, 351/124, 128, 204, 63

[56] References Cited

U.S. PATENT DOCUMENTS 5,642,177   6/1997   Nishioka ..................................... 351/47

*Primary Examiner*—Huy Mai
*Attorney, Agent, or Firm*—Raymond Y. Chan; David & Raymond

[57] ABSTRACT

A detachable sunglasses with an adjustable bridge is adapted for selectively adjusting the distance between two sun-lenses thereof, so that a particular style and size of such sunglasses can fit various shapes and sizes of eyeglasses. The adjustable bridge comprises a first bridge rod having an affixing end attached to the inner side of the first sun-lens and an adjustable end extended from the first sun-lens; a second bridge rod having an affixing end attached to the inner side of the second sun-lens and an adjustable end extended from the second sun-lens; a bendable bridge joint adapted for connecting the first bridge rod and the second bridge rod; and a locking means for fastening the bridge joint with the first and second bridge rods, so as to construct the sunglasses capable of adjusting the distance and angle between the two sun-lenses.

7 Claims, 6 Drawing Sheets

DETACHABLE SUNGLASSES WITH ADJUSTABLE BRIDGE

FIELD OF THE PRESENT INVENTION

The present invention relates to detachable sunglasses, and more particularly to an adjustable bridge of the detachable sunglasses, adapted for selectively adjusting the distance and angles between two rims of the sunglasses, so that a particular style and size of such sunglasses can fit various kinds and sizes of spectacles.

BACKGROUND OF THE PRESENT INVENTION

Conventional detachable sunglasses, such as clip-on sunglasses, has no temple and is constructed for detachably mounted to a regular eyeglasses. Therefore, a shortsighted or farsighted person can directly attach the clip-on sunglasses to his or her shortsighted or farsighted eyeglasses instead of having a pair of special made spectacles with shortsighted or farsighted lenses.

Although there are uncountable number of styles and kinds of eyeglasses designed for different kinds of people and usage, every eyeglasses consists of a bridge having a predetermined length connecting the two lenses or the two rims. Besides, the angle between the two lenses is also pre-set by the manufacturers. However, the distance between two eyes of everybody is not a constant value while a particular style of eyeglasses normally contains a fixed length of bridge. Alternative speaking, since no one has an identical face, no glasses with a fixed length of bridge can fit everybody. Therefore, up to now, all eyeglass wearers may not select the favor style glasses frame only. They must try all styles individually. Sometimes, you may fond of a particular fashion style of glasses frame but the distance between rims may not fit your distance between eyes.

In view of the conventional detachable sunglasses, a particular kind of eyeglasses must use a respective detachable sunglasses in order to fit the bridge length. It would be a good news to all sunglasses manufacturers and consumers if there is a universal detachable sunglasses that can fit various sizes and styles of eyeglasses.

SUMMARY OF THE PRESENT INVENTION

The main object of the present invention is to provide a detachable sunglasses with adjustable bridge, which is adapted for selectively adjusting the distance and angle between two sun-lenses, so that a particular style and size of such detachable sunglasses can fit different shapes and sizes of spectacle.

Another object of the present invention is to provide a detachable sunglasses with adjustable bridge, in which the adjustable bridge can be pivoted to fold up the two sun-lenses of the sunglasses to save storing space and for easy carrying.

Another object of the present invention is to provide a detachable sunglasses with adjustable bridge, which enables the two lenses to be detached from each other, so that if any one of the two lenses breaks, the user may merely replace that piece of lens instead of replacing the whole sunglasses. Moreover, the user may exchange both or either one of the sun-lenses to other colors anytime.

Another object of the present invention is to provide a detachable sunglasses comprises two sun-lenses, an adjustable bridge connected between the two sun-lenses, and a mounting means for detachably attaching the two lenses in front of the two lenses of an eyeglass, wherein the user is easy to assemble and can freely cut the sun-lenses according to the lenses of the eyeglass.

In order to accomplish the above objects, the present invention provides a detachable sunglasses for spectacles comprising a pair of sun-lenses, an adjustable bridge connected between the two sun-lenses, and a mounting means for detachably attaching the two sun-lenses in front of the two lenses of an eyeglass.

The adjustable bridge comprises a first bridge rod having an affixing end connected to an inner side of the first sun-lenses and an adjustable end extended from the first sun-lenses, a second bridge rod having an affixing end connected to an inner side of the second sun-lenses and an adjustable end extended from the second sun-lenses, a first connector, and a second connector.

The first connector and the second connector each has a hinge-end and a connecting end. The two hinge-ends of the first and second connectors are pivotally connected together by means of an axial screw. The connecting ends of the first and second connectors each has an axial receiving socket. The two adjustable ends of the first and second bridge rods are fittedly inserted into the two receiving sockets of the first and second connectors respectively. The adjustable bridge further comprises a locking means for fastening the first and second connectors with the first and second bridge rods, so as to enable the sunglasses to adjust the distance between the two sun-lenses.

DETAILED DESCRIPTION OF THE PREFERRED EMBODIMENT

Figure 1:
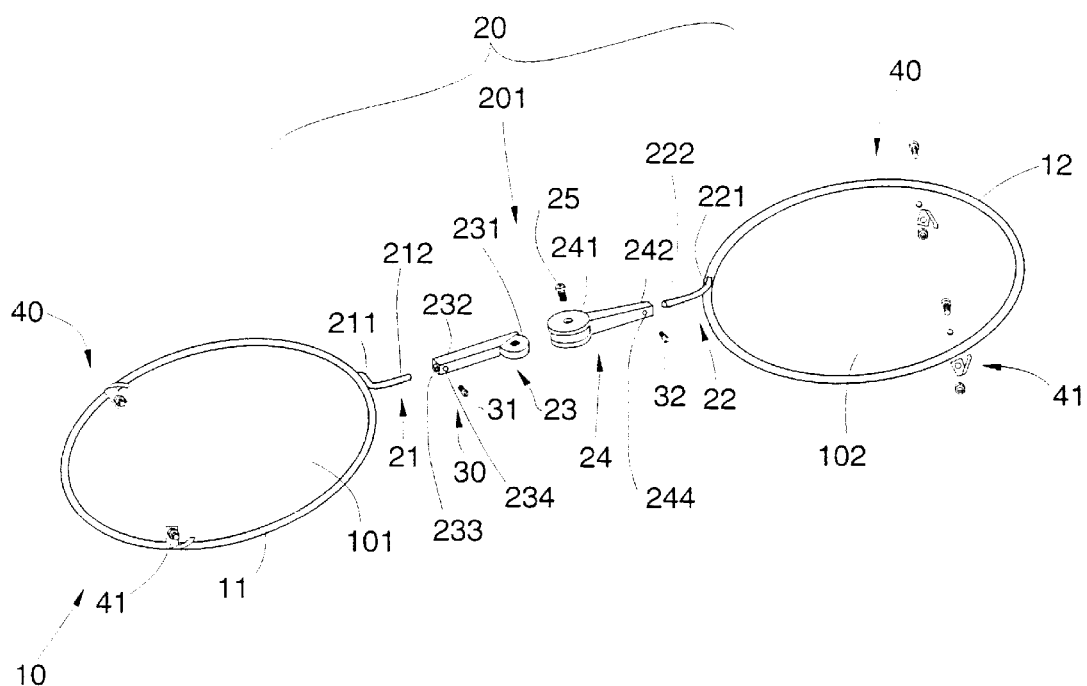
FIG. 1 is an exploded perspective of a detachable sunglasses with adjustable bridge according to a first preferred embodiment of the present invention.
Figure 2:
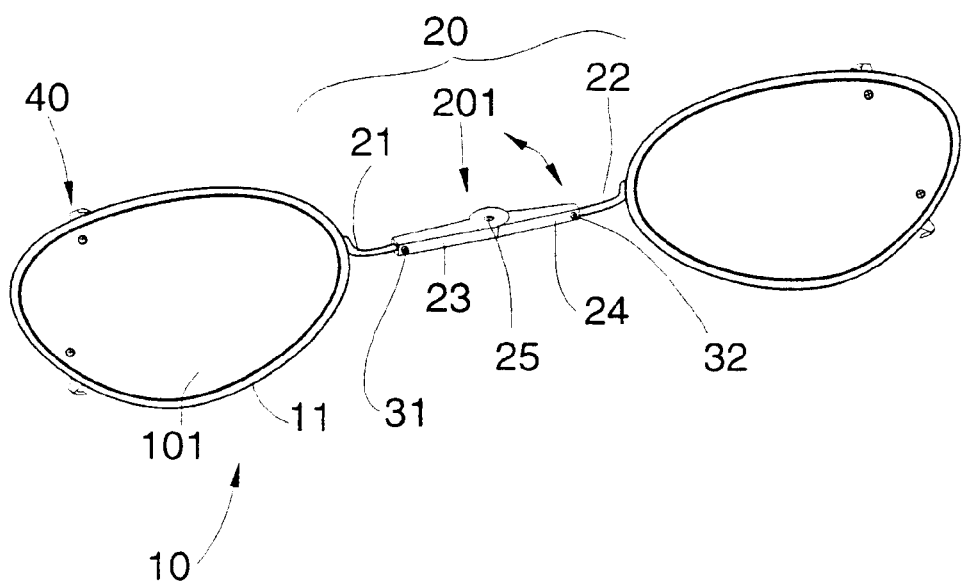
FIG. 2 is a perspective view of the detachable sunglasses according to the above first preferred embodiment of the present invention.
Figure 3:
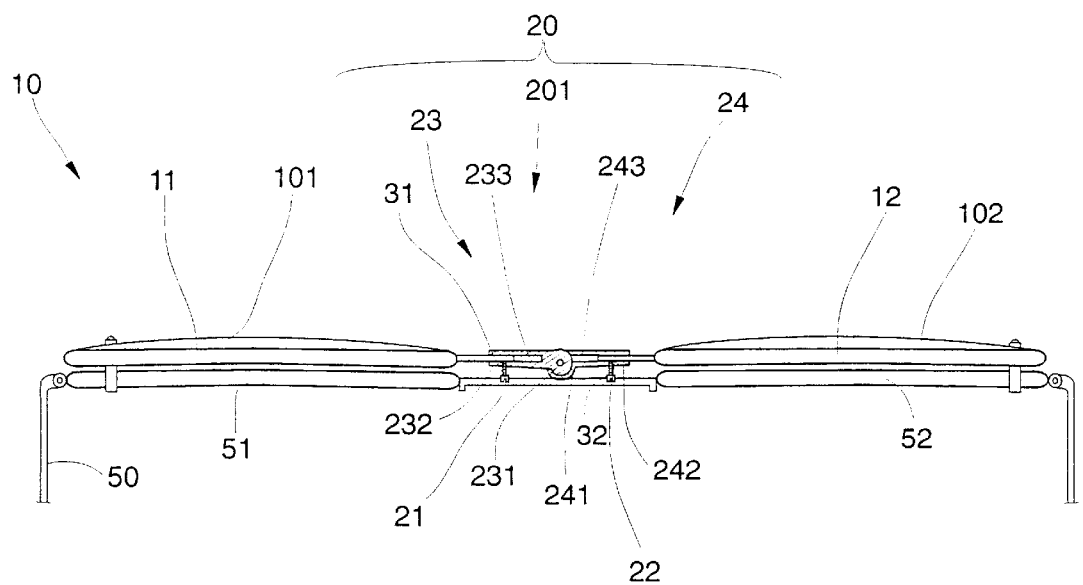
FIG. 3 is a sectional plan view of the detachable sunglasses according to the above first preferred embodiment of the present invention.

Referring to FIGS. 1 to 4 of the drawings, a detachable sunglasses 10 according to a first preferred embodiment of the present invention is illustrated, wherein the detachable sunglasses 10 comprises a pair of sun-lenses 101, 102, an adjustable bridge 20 connected between the two sun-lenses 101, 102, and a mounting means 40 for detachably attaching the two sun-lenses 101, 102 in front of two lenses 51, 52 of an eyeglasses 50 (as shown in FIG. 3).

The adjustable bridge 20 comprises a first bridge rod 21 having an affixing end 211 connected to an inner side of the first sun-lenses 101 and an adjustable end 212 extended from the first sun-lenses 101, a second bridge rod 22 having an affixing end 221 connected to an inner side of the second sun-lenses 102 and an adjustable end 222 extended from the second sun-lenses 102, a bridge joint 201 which includes a first connector 23 and a second connector 24, and a locking means 30 adapted for fastening the first and second connectors 23, 24 with the first and second bridge rods 21, 22 so as to construct the glasses frame 10a or 10b that can adjust the distance between the two rims 11, 12.

According to the above first preferred embodiment, the sunglasses 10 further comprises a first rim 11 and a second rim 12 for mounting the two sun-lenses 101, 102 thereon, wherein the two affixing ends 211, 221 are integrally connected to the first and second rims 11, 12 respectively.

The first connector 23 and the second connector 24 each has a hinge-end 231, 241 and a connecting end 232, 242. The two hinge-ends 231, 241 of the first and second connectors 23, 24 are pivotally connected together by means of a screw axle 25. The screw axle 25 can fasten the pivotally connection of the two hinge-ends 231, 241 so as to lock up the angle between the connectors 23, 24. Slightly untighten the screw axle 25 enables the user to pivotally bend the bridge joint 201 so as to adjust the angle between the first and second connectors 23, 24.

As shown in FIGS. 1 to 3, the connecting ends 232, 242 of the first and second connectors 23, 24 each has an axial receiving socket 233, 243. The two adjustable ends 212, 222 of the first and second bridge rods 21, 22 are fittedly inserted into the two receiving sockets 233, 243 of the first and second connectors 23, 24 of the bridge joint 201 respectively. It is preferable that the first and second bridge rods 21, 22 and the two receiving sockets 233, 243 each has a non-circular cross section to avoid unexpected rotation of the first and second bridge rods 21, 22 with respect to the two receiving sockets 233, 243.

According to the first preferred embodiment, as shown in FIG. 1, each of the connecting ends 232, 242 of the first and second connectors 23, 24 has a locking threaded hole 234, 244 at an inner surface thereof. The locking means 30 comprises two locking screws 31, 32 respectively screwing into the two locking threaded holes 234, 244 until pressing against the first and second bridge rods 21, 22 respectively, so as to fasten the two bridge rods 21, 22 extended from the two rims 11, 12 to the two connecting ends 232, 242 of the bridge joint 201.

The mounting means 40 can be any conventional device adapted for mounting the two sun-lenses 101, 102 in front of the two lenses 51, 52 of the spectacles 50, as shown in FIG. 3. According to the first preferred embodiment, the mounting means 40 includes a plurality of mounting clips 41 screwed to the edges of the two sun-lenses 101, 102 respectively or extended from the two rims 11, 12 respectively for clipping on the rims of the spectacles 50. Alternatively, other available mounting means such as magnetic connection or wire clipping can also be utilized in the present invention.

By incorporating the adjustable bridge 20 of the present invention with the regular detachable sunglasses or even the rimless detachable sunglasses, the user is free to adjust the distance between the two sun-lenses 101, 102 to fit his or her spectacles. No specific tool is required. Besides, the user may further adjust the angle between the two lenses 101, 102 by unfastening the screw axle 25 and bending the two connectors 23, 24 about the screw axle 25 to fit his or her spectacles. After the personal adjustment of the bridge 20 with respect to the shape and size of the user's spectacles, the user may simply re-fasten the screw axle 25 and the two locking screws 31, 32 to firmly lock and set the adjusted shape and condition thereof.

Figure 4:
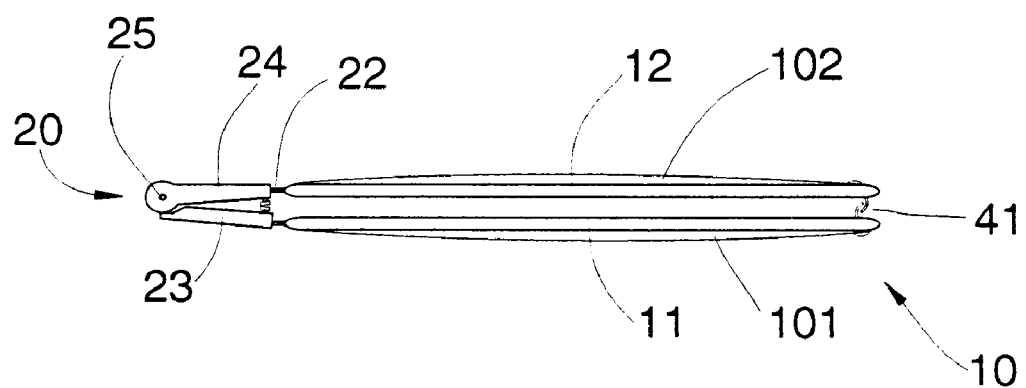
FIG. 4 is a plan view of the detachable sunglasses in folded up condition according to the above first preferred embodiment of the present invention.

FIG. 4 illustrates that, due to the adjustable bridge 20 of the present invention, the detachable sunglasses 10 can be folded up to reduce its storing size by 50%. In other words, the detachable sunglasses 10 of the present invention is more portable for carrying in user's pocket or female user's handbag.

Different eyeglasses may have different sizes and shapes. By constructing the adjustable bridge 20 with the detachable sunglasses 10 of the present invention, the wearer can first adjust the distance between the first and second rims 11, 12, i.e. the two sunlenses 101, 102, to match the respective distance between the rims of the regular eyeglasses 30. In other words, by means of the adjustable bridge 20, a particular detachable sunglasses 10 can be adapted to attach on various regular eyeglasses having different sizes and shapes.

Figure 5:
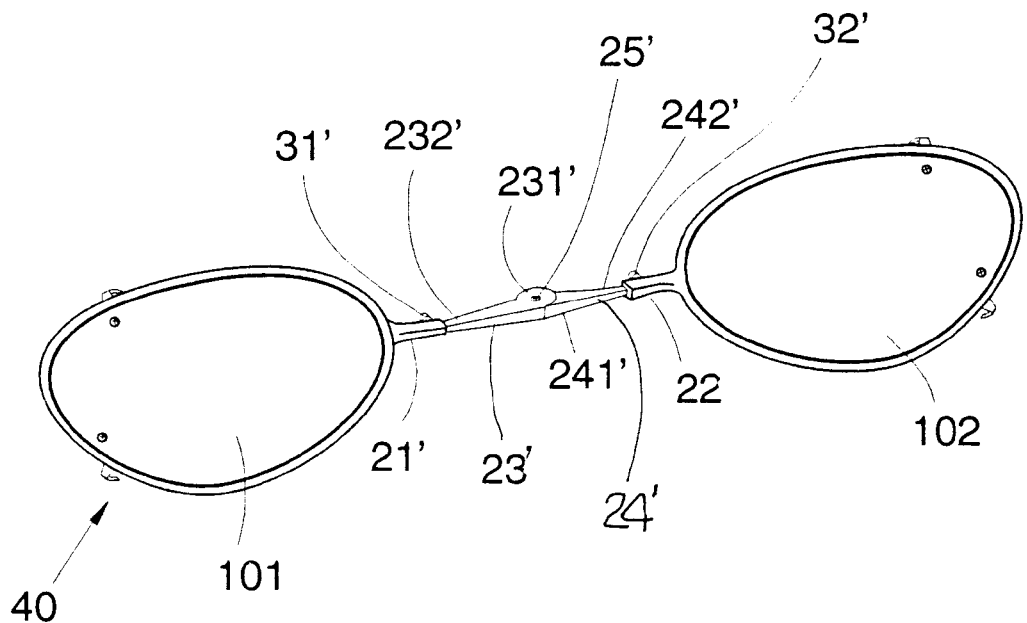
FIG. 5 is a perspective view of a detachable sunglasses with adjustable bridge according to a second preferred embodiment of the present invention.

FIG. 5 illustrates an alternative mode of the above described preferred embodiment of the present invention, wherein the first bridge rod 21' and the second bridge rod 22' each has a tubular cross section, and that the first and second connectors 23', 24' are both in bridge rod shaped. Therefore, the connecting ends 232', 242' of the first and second connectors 23', 24' are inserted into the first and second bridge rod 21', 22' respectively. The two hinge-ends 231', 241' are also pivotally connected together by a screw axle 25'. The two locking screws 31', 32' are screwed to the tubular first and second bridge rods 21', 22' instead.

Figure 6:
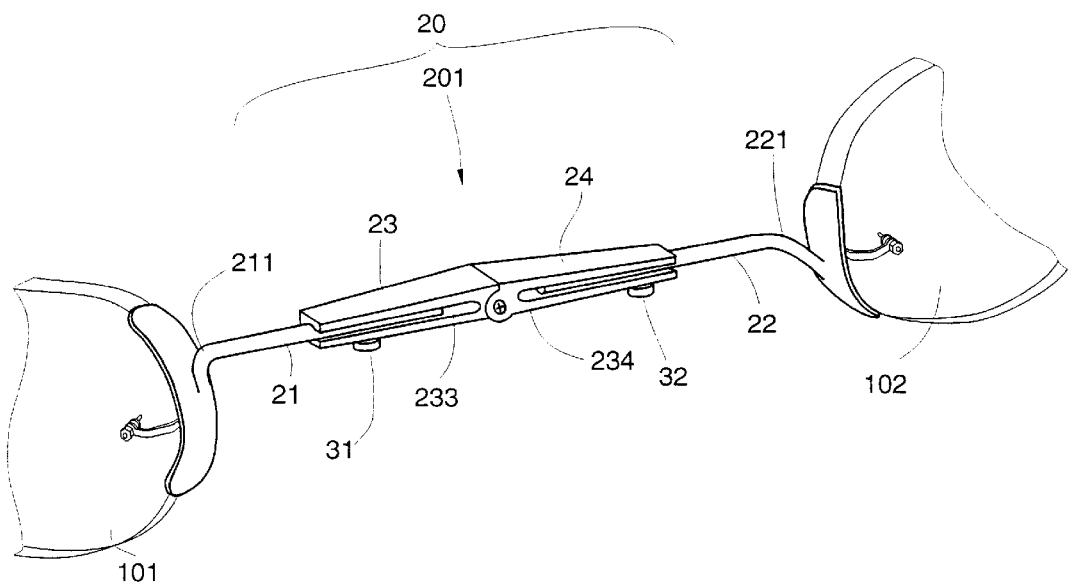
FIG. 6 is an enlarged view of an alternative mode of the adjustable bridge according to the above first preferred embodiment of the present invention.

FIG. 6 illustrates another alternative mode of the above described preferred embodiment, wherein a rimless sunglasses is shown. Such rimless sunglasses has no rim provided and the affixed ends 211, 221 of the first and second bridge rods 21, 22 of the adjustable bridge 20 of the present invention are directly affixed to the lenses 101, 102 too. This alternative mode further illustrates a modification that can be alternatively made in the above described embodiment, wherein each of the two axial receiving sockets 233, 243 of the first and second connectors 23, 24 of the bridge joint 201 is an axial groove having a C-shaped cross section.

It is worth to mention that, the adjustable bridge 20 of the present invention can also be incorporated with a regular eyeglasses, such as lorgnette, shortsighted or farsighted eyeglasses, which comprises two rims for mounting two lenses therein, two nose pads attached to the two rims respectively, and two temples pivotally connected to the two rims, wherein the adjustable bridge 20 can be used to replace the conventional bridge so that the user is free to adjust the distance between the two rims to fit his or her face anytime by himself or herself.

For example, if the user grows fatter for couple months, the user may unfasten the two locking screws 31, 32 by a screwdriver to release the tight locking condition of the two bridge rods 21, 22. Therefore, the user may easily pull out a little length of the first and second bridge rods 21, 22 from the two axial receiving socket 233, 243 respectively to fit his or her wider face. After the precise adjustment, the user can fasten the two locking screws 31, 32 again to maintain the right and comfortable distance between the two rims 21, 22 to fit the user's face and the distance between eyes.

In view of above, the present invention can achieve the following features:

1. The adjustable bridge is adapted for selectively adjusting the distance and angles between two rims of the glasses frame, so that a particular style and size of such glasses frame can fit different faces of all users.

2. The adjustable bridge can be equipped with an attachable sunglasses so that the distance between the two shading lenses of a particular attachable sunglasses can be adjusted to fit various sizes and styles of eyeglasses.

3. The adjustable bridge for glasses frame enables the two rims to be detached from each other, so that if any one of the two rims breaks, the user may merely replace that rim instead of replacing the whole eyeglasses.

What is claimed is:

1. A detachable sunglasses, comprising a first and a second sun-lens, an adjustable bridge connected between said two sun-lenses, and a mounting means for detachably attaching said first and second sun-lenses in front of two lenses of an eyeglasses, said adjustable bridge comprising:

a first bridge rod having an affixing end attached to an inner side of said first sun-lens and an adjustable end extended from said first sun-lens;

a second bridge rod having an affixing end attached to an inner side of said second sun-lens and an adjustable end extended from said second sun-lens;

a bendable bridge joint having two ends adapted for connecting with said adjustable ends of said first bridge rod and said second bridge rod respectively; and a locking means for fastening said bridge joint with said first and second bridge rods, so as to adjust a distance between said two sun-lenses by adjusting said first and second bridge rods with respect to said bendable bridge joint.

2. The detachable sunglasses as recited in claim 1 wherein said bendable bridge joint comprises a first connector and a second connector, wherein each of said first connector and said second connector has a hinge-end and a connecting end, said two hinge-ends of said first and second connectors being pivotally connected together by means of an axial screw, said connecting ends of said first and second connectors each having an axial receiving socket, said two adjustable ends of said first and second bridge rods being fittedly inserted into said two receiving sockets of said first and second connectors respectively.

3. The detachable sunglasses as recited in claim 2 wherein each of said connecting ends of said first and second connectors has a locking threaded hole at an inner surface thereof, and that said locking means comprises two locking screws respectively screwing into said two locking threaded holes until pressing against said first and second bridge rods respectively so as to fasten said first and second bridge rods extended from said two sun-lenses to said two connecting ends of said bridge joint.

4. The detachable sunglasses as recited in claim 2 wherein each of said two axial receiving sockets of said first and second connectors of said bridge joint is an axial groove having a C-shaped cross section.

5. The detachable sunglasses as recited in claim 4 wherein each of said connecting ends of said first and second connectors has a locking threaded hole at an inner surface thereof, and that said locking means comprises two locking screws respectively screwing into said two locking threaded holes until pressing against said first and second bridge rods respectively so as to fasten said two bridge rods extended from said two sun-lenses to said two connecting ends of said bridge joint.

6. The detachable sunglasses as recited in claim 1 wherein said bendable bridge joint comprises a first connector and a second connector, wherein each of said first connector and said second connector has a hinge-end and a connecting end, said two hinge-ends of said first and second connectors being pivotally connected together by means of an axial screw, wherein said first bridge rod and said second bridge rod each having a tubular cross section, said first and second connectors being both in bridge rod shaped, said connecting ends of said first and second connectors being inserted into said first and second bridge rod respectively.

7. The detachable sunglasses as recited in claim 6 wherein each of said tubular first and second bridge rods has a locking threaded hole at an inner surface thereof, and that said locking means comprises two locking screws respectively screwing into said two locking threaded holes until pressing against said connecting ends of said first and second connectors respectively so as to fasten said first and second bridge rods extended from said two sun-lenses to said two connecting ends of said bridge joint.

* * * * *